United States Patent
Fior et al.

(10) Patent No.: US 6,926,347 B2
(45) Date of Patent: Aug. 9, 2005

(54) PICKUP TRUCK WITH CAB-OVER-ENGINE AND GOODS OR PASSENGER TRANSPORT PLATFORM

(75) Inventors: Claude Fior, deceased, late of Caupenne d'Armagnac (FR); by Fabien Fior, legal representative, Caupenne d'Armagnac (FR); by Céline Fior, legal representative, Caupenne d'Armagnac (FR)

(73) Assignee: Nogaro Technologies, Nogaro (FR)

( * ) Notice: Subject to any disclaimer, the term of this patent is extended or adjusted under 35 U.S.C. 154(b) by 0 days.

(21) Appl. No.: 10/451,244

(22) PCT Filed: Dec. 20, 2001

(86) PCT No.: PCT/FR01/04099

§ 371 (c)(1),
(2), (4) Date: Dec. 29, 2003

(87) PCT Pub. No.: WO02/49875

PCT Pub. Date: Jun. 27, 2002

(65) Prior Publication Data

US 2004/0094339 A1 May 20, 2004

(30) Foreign Application Priority Data

Dec. 21, 2000 (FR) .............................................. 00 16788

(51) Int. Cl.[7] ............................................ B62D 33/04
(52) U.S. Cl. ................................ 296/182.1; 296/186.4
(58) Field of Search .......................... 296/181.3, 181.7, 296/182.1, 186.4, 183.1

(56) References Cited

U.S. PATENT DOCUMENTS

| | | | |
|---|---|---|---|
| 2,278,450 A | | 4/1942 | Jones |
| 2,616,754 A | * | 11/1952 | Stahl .......................... 296/183.1 |
| 2,720,413 A | * | 10/1955 | Halverson ................. 296/186.4 |
| 3,489,427 A | | 1/1970 | Veamals et al. |
| 3,941,261 A | | 3/1976 | Ricci |
| 4,249,768 A | | 2/1981 | Bell |
| 4,351,555 A | | 9/1982 | Hashimoto |
| 4,659,132 A | | 4/1987 | Day |
| 4,695,087 A | * | 9/1987 | Hollrock .................... 296/186.4 |
| 4,898,418 A | * | 2/1990 | Lind et al. ................ 296/182.1 |
| 4,981,381 A | * | 1/1991 | Murata ......................... 400/661 |
| 6,099,070 A | * | 8/2000 | Yocum ..................... 296/186.4 |
| 6,152,511 A | * | 11/2000 | Gustafson ................. 296/186.4 |

FOREIGN PATENT DOCUMENTS

| | | |
|---|---|---|
| DE | 18 46 491 | 2/1962 |
| DE | 86 17 692.7 | 3/1987 |
| GB | 160 720 | 3/1921 |

* cited by examiner

Primary Examiner—Lori L. Coletta
(74) Attorney, Agent, or Firm—Leydig, Voit & Mayer, Ltd.

(57) ABSTRACT

A pickup truck with a cab-over-engine and a platform for goods and passenger transport is provided wherein the platform comprises at least one longitudinal drop-level lower loading plate, and adjacent to each lower loading plate, at least an upper loading plate, raised relative to the lower loading plate and parallel thereto, and wherein for each lower loading plate, a longitudinal flap is articulated on an upper loading plate adjacent to the lower loading plate and having a length not less than that of the lower loading plate, the flap being adapted to tilt between a folded position on the upper loading plate wherein it clears a volume located above the lower loading plate, and an unfolded position above the lower loading plate wherein it forms a plate with each upper loading plate adjacent thereto.

15 Claims, 5 Drawing Sheets

PICKUP TRUCK WITH CAB-OVER-ENGINE AND GOODS OR PASSENGER TRANSPORT PLATFORM

FIELD OF THE INVENTION

The invention concerns a pickup truck with cab-over-engine and transport platform for goods or passengers.

BACKGROUND OF THE INVENTION

Current pickup trucks are equipped with a loading platform defining a fixed effective loading area irrespective of the desired applications of the vehicle. Each type of pickup truck therefore comprises a fixed loading structure which does not permit adaptation of the loading surface to the type of goods to be transported and/or adaptation for goods or passenger transport.

BRIEF SUMMARY OF THE INVENTION

The present invention sets out to remedy this disadvantage and puts forward a pickup truck having an effective loading area that can be modulated according to the applications of vehicle.

The invention also sets out more particularly, to provide a pickup truck of the type having a versatile effective loading area consisting of a self-propelled road vehicle having a tare of less than 550 kg (excluding storage battery for electric vehicles) and having a loading area (excluding driver cabin) of more than 3 m² for a gross weight of less weight 1 500 kg. The invention especially proposes a vehicle of this type that is electrically propelled and is able to carry an effective load (excluding driver) on this load surface area of up to 600 kg.

The invention particularly concerns the production of said vehicle able to be certified in the category of so-called heavy quadricycles.

For this purpose the invention concerns a pickup truck whose platform comprises:

- at least one longitudinal drop-level loading deck, called lower loading plate, and adjacent to each of lower loading plates along a longitudinal direction of the pickup truck (direction of movement) at least one so-called upper loading plate, that is raised relative to said lower loading plate and parallel to it.
- for each lower plate a longitudinal flap articulated on an upper plate adjacent to said lower plate and having a length not less than the length of the latter, said flap being adapted to tilt between a folded position on the upper plate wherein it clears the volume located above the lower plate and an unfolded position over said lower plate wherein it forms a plate with each upper plate adjacent thereto.

Said pickup truck therefore comprises a platform which can be very easily modulated by simple tilting of at least one flap between an open and a folded position, possibly comprising according to configuration:

- at least one loading plate with lowered loading level for easy loading and transport of voluminous items of sizeable height using the available height above each lower plate. In this configuration, in addition, at least one raised loading plate for the transport of other items.
- a raised loading plate of large surface area below which a boot is provided under each opened flap delimited by said flap and the corresponding lower plate.

Also, by providing a few fittings to ensure the safety and comfort of passengers, said vehicle can be used either to transport persons sitting on one (or more) upper plates with their feet resting on the lower plate adjacent to this (or these) upper plates, or for the transport of goods arranged on each upper plate after unfolding the flap or flaps.

Also, as will be better understood below, this type of design is particularly adapted for producing self-propelled road vehicles with low tare (less than 550 kg excluding battery), having a large load surface area (over 3 m² excluding driver cabin), able to carry heavy loads (up to 600 kg) and able to be certified in the category of so-called heavy quadricycles.

Advantageously, the length of each upper plate on which a flap is articulated is greater than the length of the lower plate over which this flap can be opened, said flap being articulated on said upper plate on the edge where the latter adjoins said lower plate.

Also, each lower plate advantageously comprises at least one loading ramp articulated relative to a free end of said plate so that it can tilt between a loading position, resting on the ground, and a position in which it extends vertically closing the corresponding side of the volume delimited by said lower plate.

Said ramps allow for very easy loading and unloading of voluminous items and also form a bodywork part in their vertical position.

Advantageously, each lower plate is arranged in median position between two upper plates, of which one is fitted with a flap able to be unfolded over said lower plate.

In addition, each lower plate then advantageously comprises two side loading ramps.

According to one first advantageous embodiment, and according to the invention, each upper plate is fitted with transverse and longitudinal peripheral side racks, the transverse side rack which is adjacent to a lower plate and positioned level with an upper plate equipped with a flap able to be opened over said lower plate, being fixed to said flap so that it can tilt with the latter.

Also, advantageously, the length of each loading ramp is adapted to form a side rack at least equal in height to the height of the side racks of each upper plate when the flap of the lower plate fitted with said ramp is unfolded.

According to a second advantageous embodiment, and according to the invention, the platform carries a superstructure formed of bodywork walls forming a van.

In addition, the bodywork walls advantageously comprise at least one access door to each lower loading plate.

Advantageously each upper plate consists of at least one boot formed by an upper wall and four vertical side walls, at least one said walls forming an access wall to the inner volume of said boot.

The pickup truck of the invention also advantageously comprises a rear rigid tubular framework rigidly fixed to the platform and extending backwards relative to said platform, said framework forming a mount for a propelling engine and being encased so as to have a planar upper wall forming an upper loading plate.

Also the engine is advantageously an electric motor one of the boots being adapted to house a storage battery.

Also advantageously, this pickup truck comprises a boot adjacent to the rear framework and forming an upper plate with the upper encasing wall of said rear framework, said boot being adapted to house a second storage battery or a heat engine coupled to an electric current generator able to charge the storage battery or to supply the electric motor.

Advantageously, the platform and rear framework define an effective loading area of more than 3 m² and for this purpose the platform advantageously comprises a single lower median plate arranged between two upper plates, front and rear.

BRIEF DESCRIPTION OF THE SEVERAL VIEWS OF THE DRAWINGS

Other characteristics, objectives and advantages of the invention will be seen in the following detailed description with reference to the appended drawings which give a non-restrictive example of a preferred embodiment. In these drawings.

DETAILED DESCRIPTION OF THE INVENTION

Figure 1:
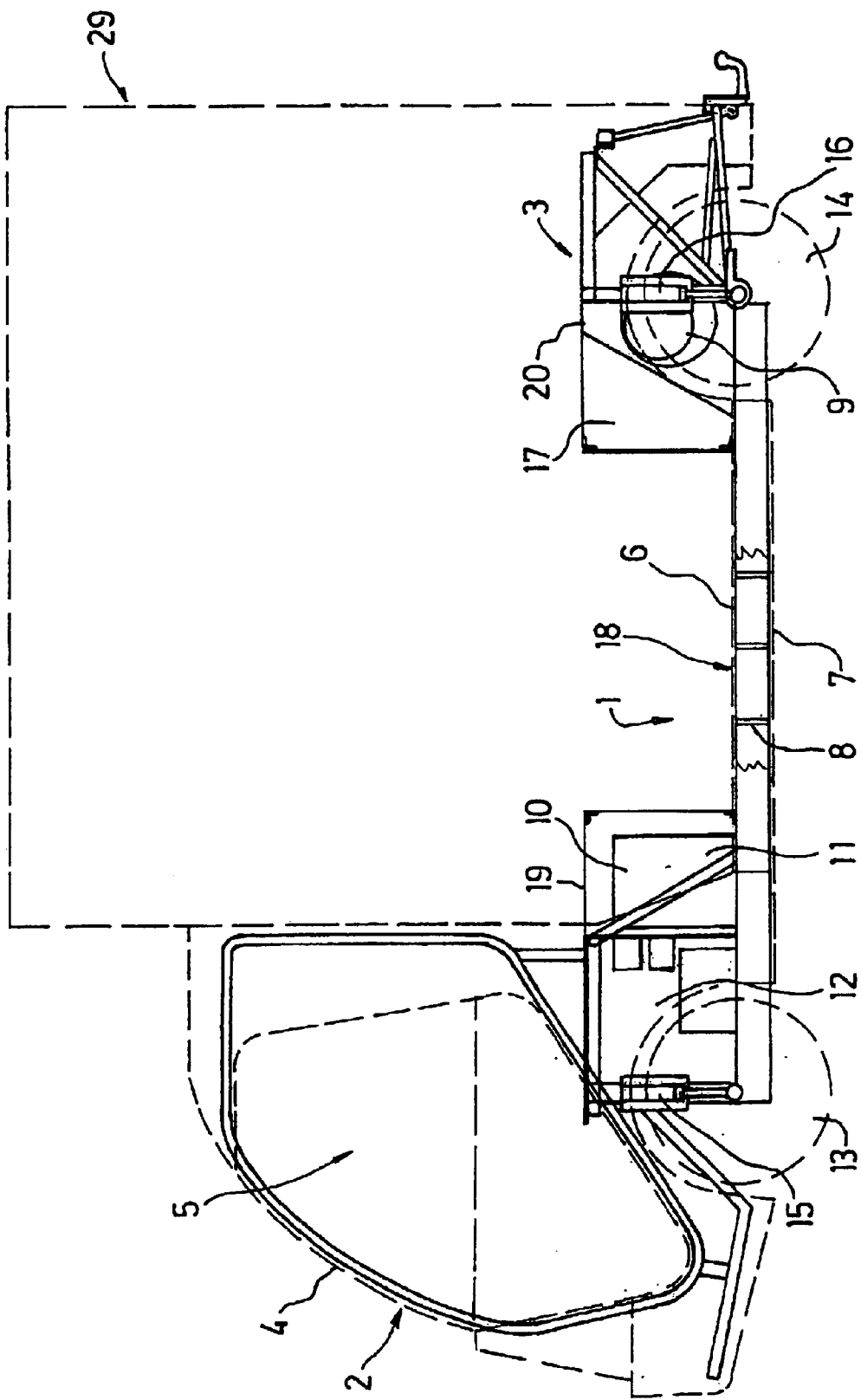
FIG. 1 is a vertical, longitudinal section diagram of the chassis of a pickup truck of the invention, equipped with a first superstructure example.

The pickup truck of the invention comprises a chassis shown in FIG. 1 formed of a platform 1 made of a sandwich structure, a front rigid tubular framework 2 rigidly fixed to the front of platform 1 and extending forwards relative to the latter, and a rear tubular framework 3 rigidly fixed to the rear of platform 1 and extending backwards relative to the platform. Frameworks 2, 3 are tubular in that they are essentially formed of tubes, but may incorporate other parts such as rigidifying plates, truss rods, cables, stays or reinforcement bars.

Front framework 2 is adapted to form and/or carry a cabin floor and comprises a superstructure 4 also rigid tubular to which bodywork parts defining a cabin 5 are fixed.

Platform 1 is formed of an upper planar metal plate 6, a lower planar metal plate 7 of substantially similar size and shape to upper plate 6, these two plates 6, 7 being arranged so as to extend one above the other and are connected via a rigid lattice work of cross bars such as 8 inserted between them and fixed to them by riveting and/or bonding. This platform 1, and hence plates 6,7, also have the general shape of a rectangular deck whose longitudinal ends are shortened however to provide wheel openings.

Each of frameworks 2,3 is formed of steel tubes welded and/or bolted together, i.e. it is a mechanically welded structure. The shape given to these frameworks 2, 3 depends upon the characteristics it is desired to give the vehicle and the functions to be performed by said frameworks. In the examples shown in the figures, rear framework 3 serves as mount for engine 9 of the vehicle which may for example be an electric motor. This rear framework 3 also serves to fix a certain number of rear bodywork parts (rear bodywork wall, wheel openings or mudguard . . . ). Front framework 2 serves as cabin chassis and defines a first boot 10 immediately at the front of the platform, intended for example to house a storage battery 11, and a second front boot 12 intended to house the vehicle's electric or electronic devices and accessories. Boots 10, 12 are formed not only by front framework 2 but also by thin walls in metal, wood or synthetic material as appropriate.

Each framework 2, 3 is rigidly fixed to platform 1 by riveting and bonding. Also platform 1 is fixed to the lower part of frameworks 2, 3 so as to form a median drop-level deck.

The vehicle of the invention is conventionally a four-wheel vehicle, namely two front wheels 13 and two rear wheels 14. Each wheel 13, 14 is suspended relative to the chassis by a linear damper 15, 16 whose body is fixed rigidly stationary to corresponding framework 2, 3. Said linear dampers 15, 16 comprising a part with translation movement relative to the body with which wheel 13, 15 is made integral, act simultaneously as flexible return system, shock absorbers and translation guide for each of said wheels.

As mentioned above, the vehicle of the invention is a pickup trick with cab-over-engine 5, front framework 2 defining said cabin. This cabin may be fitted with any technical items for comfort, accessories required for driving the vehicle and for the transport of one or more passengers in cabin 5 (seats, steering wheel, pedals, floor, heating windscreen, windows . . . ). Platform 1 and rear framework 3 define an effective loading area at the rear of cabin 5 which can be given numerous variants of embodiment depending upon the applications of the vehicle of the invention. In the examples shown, the storage battery 11 is arranged inside front boot 10 and a rear boot 17 completes and covers rear framework 3 which encloses an electric motor 9 coupled to rear wheels 14. This rear boot 17 can be used to house a second storage battery or heat engine coupled to an electric current generator able to charge storage battery 11 or to supply electric motor 9.

Between the two front and rear boots 10, 17 platform 1 defines a median drop-level plate 18. Front boot 10 also forms a front plate 19, raised relative to median plate 18. Rear boot 17 and rear part of rear framework 3 also form a rear plate 20 raised relative to median plate 18 coplanar with front plate 13. The effective load surface area is therefore equal to the sum of the surfaces of the three plates 18, 19, 20. This effective loading area can therefore be greater than 3 m² and can take a load with a weight of up to 600 kg. Also, rear plate 20 is formed of a removable wall, which slides longitudinally for example to allow access to engine/motor 9 and the inside of rear boot 17.

Figure 3:
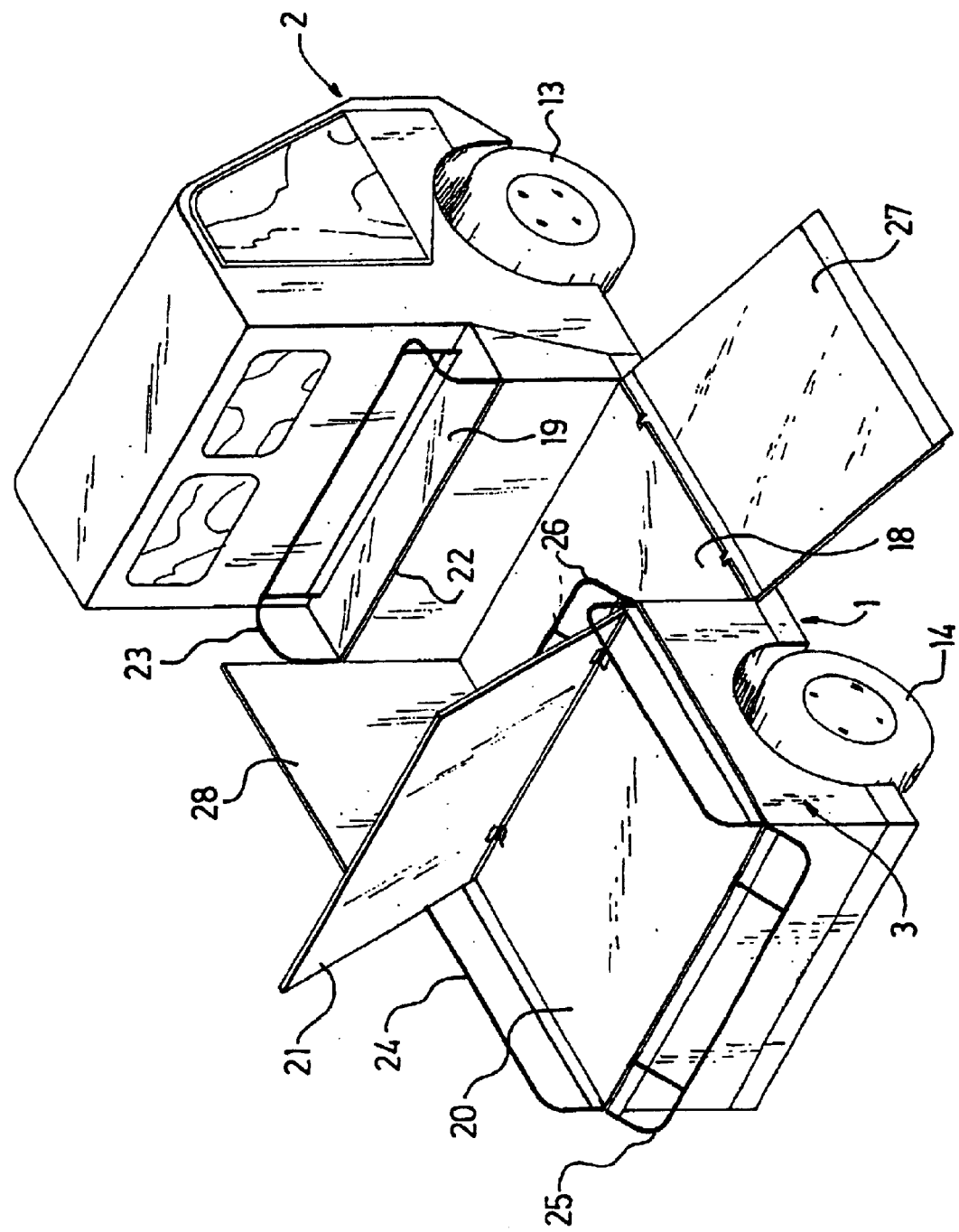
FIGS. 3 to 5 are perspective views of a second example of a pickup truck according to the invention.
Figure 4:
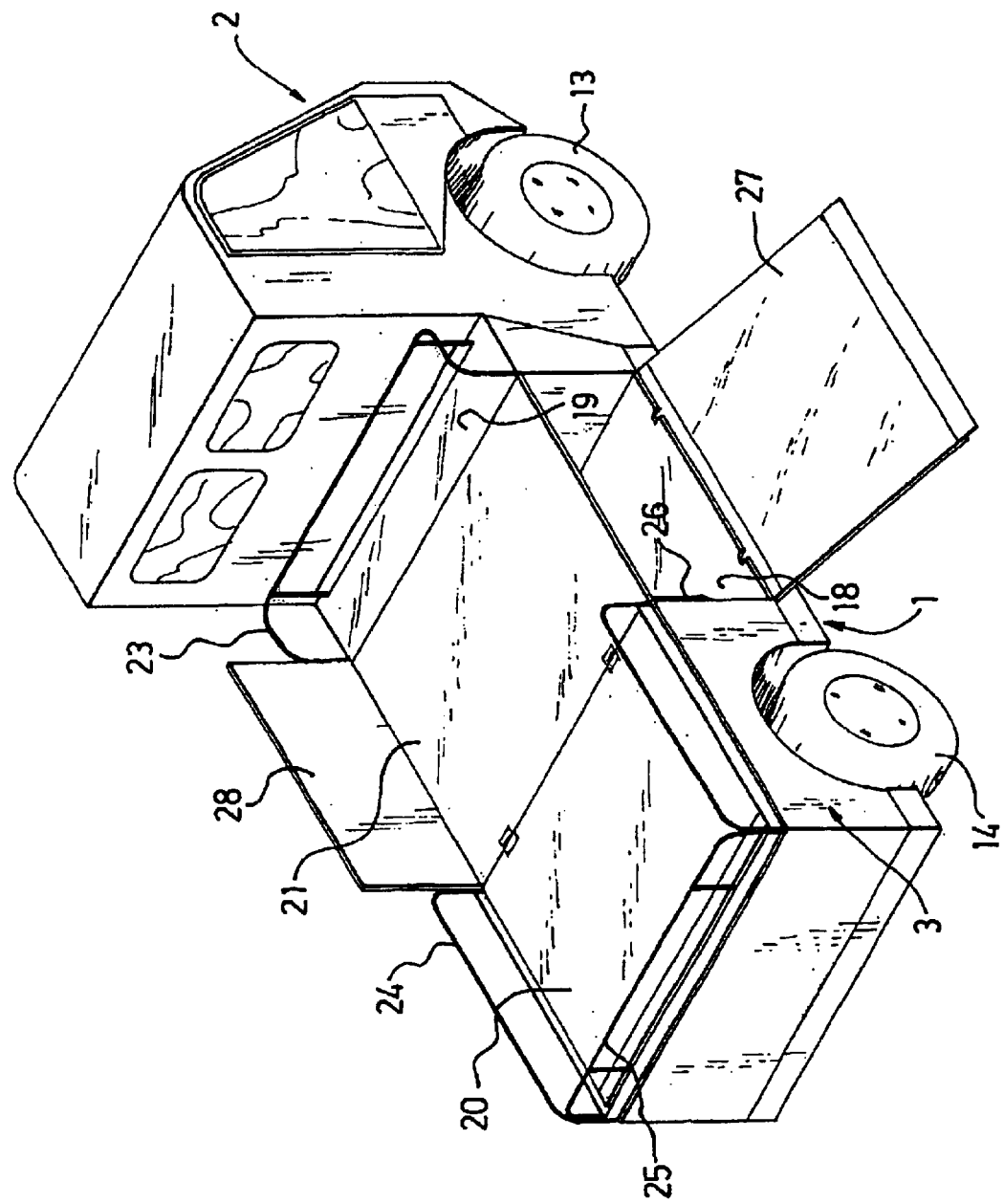
Figure 5:
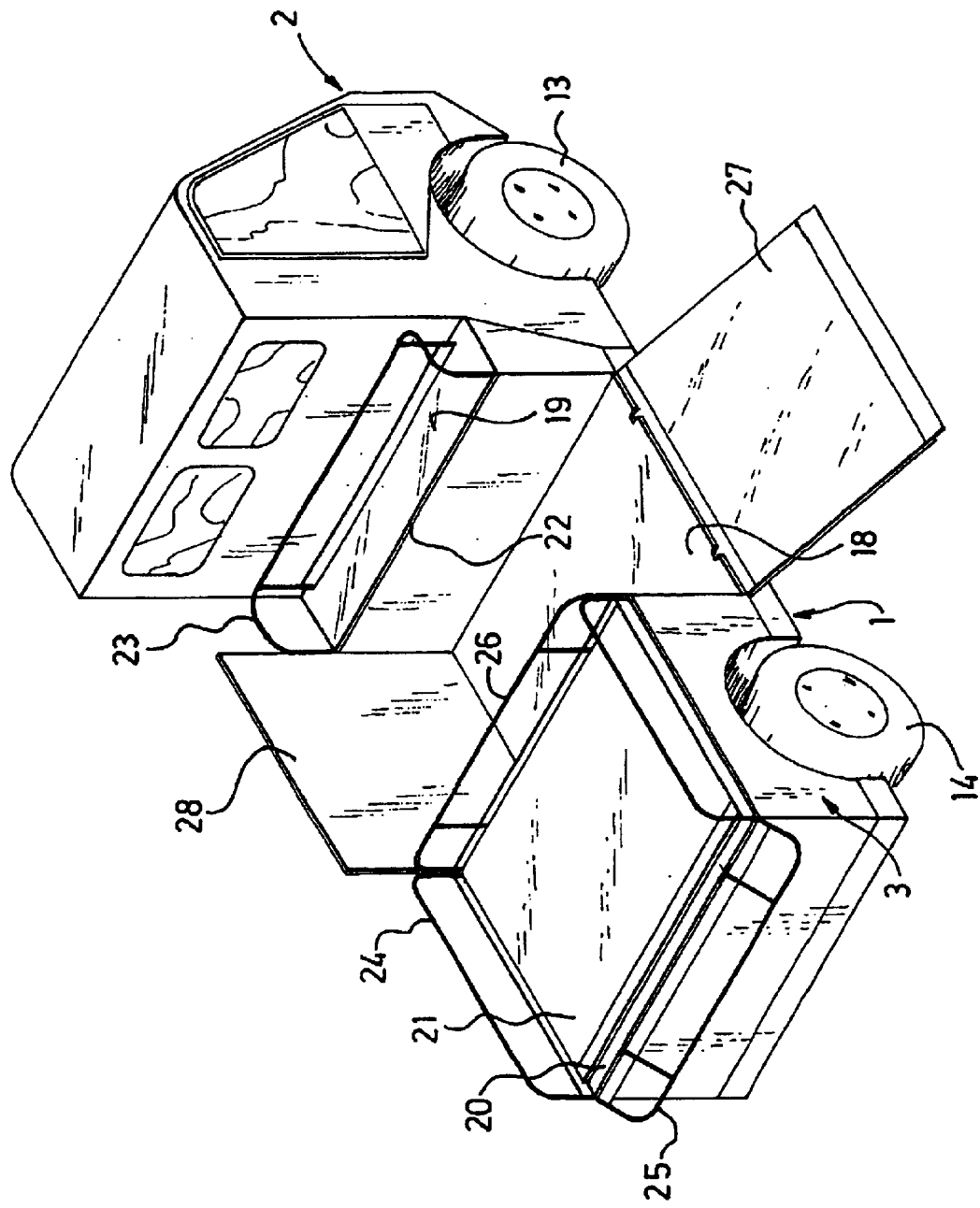

Also, as shown in FIGS. 3–5, the vehicle comprises a longitudinal flap articulated along a horizontal transverse axis on the front transverse edge of rear plate 20 and whose length is conjugate with that of median plate 18 so that it can tilt between:

a folded position over rear plate 20 where it clears the loading volume located above median plate 18 (FIG. 4)

an unfolded position over median plate 18 in which its longitudinal end fits into a transverse rabbet 22 provided on the upper edge of front plate 19 (FIG. 5). In this unfolded position the vehicle has an effective planar loading surface area equal to the surface area of platform 1 and rear framework 3. In addition a storage boot is provided between median plate 18 and flap 21.

This vehicle also comprises two side loading ramps 27, 28 each articulated on one of the longitudinal edges of median plate 18 so that it can tilt between:

- a loading position in which they are opened out over the ground and in which they allow easy loading of items on median plate 18,
- a road position in which they extend vertically upwards so that they are in profile with the side longitudinal walls of front 19 and rear plate 20 and close the longitudinal sides of median plate 18.

According to the example in FIGS. 3 to 5, front plate 19 also has a side rack 23 formed of two longitudinal side sections connected by a front transverse section.

Rear plate 20 also comprises peripheral side racks namely two longitudinal side racks such as 24 a rear transverse side rack 25 and a front transverse side rack 26.

Also rear side rack 25 is articulated on rear bodywork parts of the vehicle so that it can retract and allow removal by sliding of rear plate 20.

Front side rack 26 is integral with flap 21 so that it can tilt with the latter.

It is also to be noted that loading ramps 27, 28 have a length that is adapted to form side racks above flap 21 when the latter is opened out.

Figure 2:
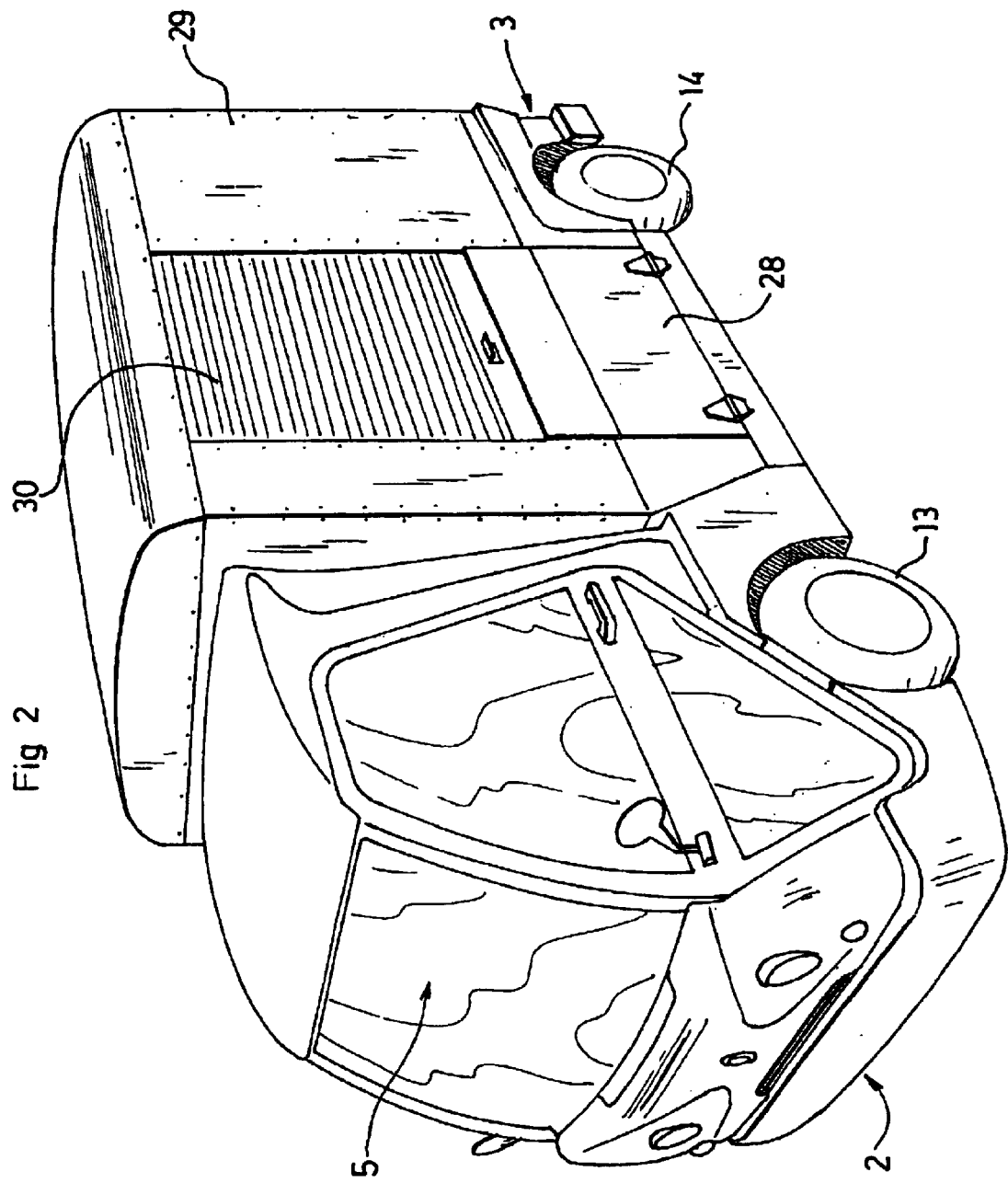
FIG. 2 is a perspective view of this pickup truck.

According to the example shown in FIGS. 1 and 2 the vehicle comprises bodywork walls 29 forming a van.

Also the van, at the level of median plate 18 has two side doors 30 such as of roll shutter type adapted to close the space between loading ramps 27, 28 and the roof of said van, and enable the loading of items whose height may reach the effective loading height of median plate 18.

This type of van may have a loading volume of more than 4 m³.

Evidently, based on the concept of a loading plate that can modulated according to the invention, other types of superstructure may be fixed to platform 1 and/or framework 3 such as a tarpaulin superstructure.

Also the vehicle of the invention may be designed so that it can transport either goods or persons. The transport of passengers may be achieved with flap 21 in folded position, by arranging seating on the free surface of the flap, the front plate 19 serving as seat and the passengers' feet resting on median plate 18. The transport of goods is conducted with flap 21 in open position in which the vehicle has a planar loading surface.

EXAMPLE

A vehicle of the invention as shown in FIG. 4 was produced with following dimensions:

overall length 3 860 mm* overall width 1 450 mm

The size of platform 1 was 2 300 mm 1 450 mm*

The total weight of the chassis of the invention (platform 1, front and rear frameworks 2, 3 dampers 15, 16, braking system, hubs and bearings) was 160 kg.

The vehicle is equipped with a 6 kW electric motor. The tare of the vehicle without a rear superstructure and excluding storage battery, heat engine and current generator is less than 550 kg so that it can be certified in the heavy quadricycle category. It has an effective load surface area of more than 3 m² and a loading volume unlimited in height which may typically be 4.5 m³ for the van shown FIG. 2. It can carry a load of 600 kg at a speed possibly reaching 60 km/h. It is to be noted that this performance is obtained when cabin 5 is equipped with all conventional items of comfort for a vehicle, namely padded seats, glass windscreen, heating unit, air vents, complete bodywork including articulated side doors.

Said heavy quadricycle can even be used to transport 4 to 6 passengers if the effective load surface area is fitted with seating.

What is claimed is:

1. A pickup truck with a cab-over-engine and a platform for goods and passenger transport, wherein said platform comprises:

at least one longitudinal drop-level lower loading plate, and adjacent to each lower loading plate at least an upper loading plate raised relative to said lower loading plate and parallel thereto, for each lower loading plate a longitudinal flap articulated on an upper loading plate adjacent to said lower loading plate and having a length not less than that of the lower loading plate, said flap being adapted to tilt between a folded position on the upper loading plate wherein it clears a volume located above the lower loading plate and an unfolded position over said lower loading plate wherein it forms a plate with each upper loading plate adjacent thereto.

2. The pickup truck according to claim 1 wherein the length of each upper loading plate on which the flap is articulated is greater than the length of said lower loading plate over which this flap may be unfolded, said flap being articulated on said upper loading plate on an edge where the upper loading plate adjoins said lower loading plate.

3. The pickup truck according to claim 1, wherein each lower loading plate comprises at least one loading ramp articulated relative to a free end of said lower loading plate so that it can tilt between a loading position resting on the ground and a position in which it extends vertically, closing the corresponding side of the volume delimited by said lower loading plate.

4. The pickup truck according to claim 3, wherein each lower loading plate is arranged in a median position between two upper loading plates one of which is fitted with a flap unfoldable over said lower loading plate.

5. The pickup truck according to claim 4, wherein each lower loading plate comprises two side loading ramps.

6. The pickup truck according to claim 2, wherein each upper loading plate is fitted with peripheral transverse and longitudinal side racks, the transverse rack adjacent to a lower loading plate arranged at the level of an upper loading plate being fitted with a flap unfoldable over said lower loading plate, being fixed on said flap so that it can tilt with the flap.

7. The pickup truck according to claim 6, wherein each lower loading plate comprises at least one loading ramp articulated relative to the free end of said lower loading plate so that it can tilt between the loading position resting on the ground and the position in which it extends vertically, closing the corresponding side of the volume delimited by said lower loading plate and the length of each loading ramp is adapted to form a side rack whose height is at least equal to the height of the side racks of each upper loading plate when the flap is unfolded over said lower loading plate fitted with said loading ramp.

8. The pickup truck according to claim 1 wherein each upper loading plate consists of at least one boot formed of an upper wall and four vertical side walls, at least one of said walls forming an access wall to the inner volume of said boot.

9. The pickup truck according to claim 8 comprising a rear rigid tubular framework rigidly fixed to the platform and extending backwards relative to said platform, said rear framework forming a mount for a propelling engine/motor and being encased so that it has a planar upper wall forming an upper loading plate.

10. The pickup truck according to claim 9, wherein the engine is an electric motor, and at least one boot being adapted to house a storage battery.

11. The pickup truck according to claim 10 comprising a boot adjacent to the rear framework and forming an upper loading plate with the upper encasing wall of said rear framework, said boot being adapted to house a second storage battery or a heat engine coupled to an electric current generator, able to charge storage battery or to supply the electric motor.

12. The pickup truck according to claim 11, wherein the platform and rear framework define an effective loading surface having an area of more than 3 $m^2$.

13. The pickup truck according to claim 12, comprising only one lower loading plate arranged between two upper loading plates front and rear.

14. The pickup truck according to claim 1, wherein the platform carries a superstructure made up of van-forming bodywork walls.

15. The pickup truck according to claim 14 wherein the bodywork walls comprise at least one access door to each lower loading plate.

* * * * *